Aug. 19, 1930.　　　M. C. SPENCER　　　1,773,285

ROTOR FOR INDUCTION MOTORS

Filed July 16, 1927

Inventor,
Millard Cole Spencer,
By *Samuel W. Balch*
Attorney.

Patented Aug. 19, 1930

1,773,285

UNITED STATES PATENT OFFICE

MILLARD COLE SPENCER, OF EAST ORANGE, NEW JERSEY, ASSIGNOR TO CROCKER-WHEELER ELECTRIC MANUFACTURING COMPANY, OF AMPERE, NEW JERSEY, A CORPORATION OF NEW JERSEY

ROTOR FOR INDUCTION MOTORS

Application filed July 16, 1927. Serial No. 206,193.

This invention relates particularly to self-starting alternating current motors of the induction type, and the object of the invention is to provide a rotor for such a motor which has a sufficiently high reactance to limit the current at starting, when the motor is connected directly across the line, so that a starting device or compensator is not required. A further object of this invention is to provide a normal low torque rotor which requires no end-rings.

In the accompanying sheet of drawings which forms a part of this description,

Figure 1:
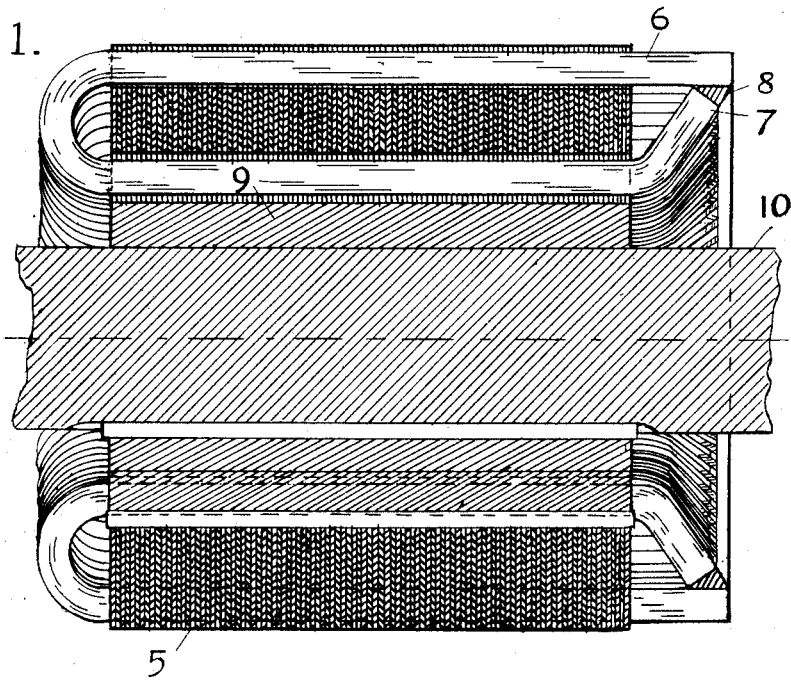
Figure 1 is a longitudinal section through the axis of the rotor.
Figure 2:
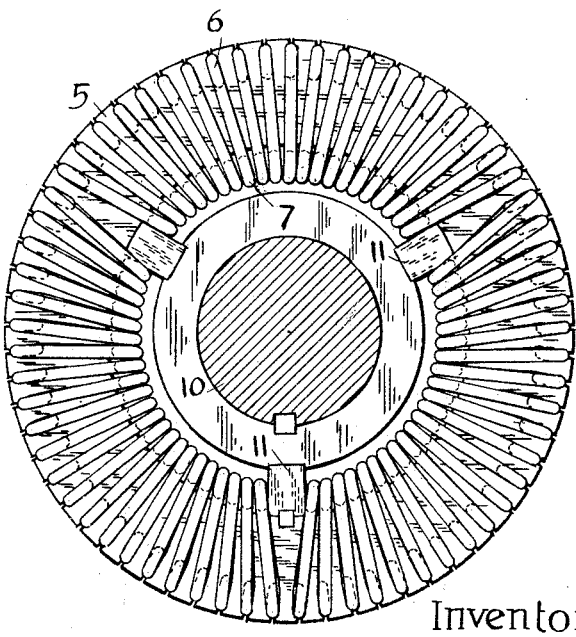
Fig. 2 is an end view of the rotor.

The rotor comprises an annular laminated core 5 with partially closed slots in its periphery. Copper bars bent midway of their ends to form parallel branches are inserted, one branch 6 of each bar lying in a slot of the core and the other branch passing through the central opening through the core and exterior to magnetic material, that is to say, not individually surrounded by either the magnetic material of the annular core or by other magnetic material. The branches are of sufficient length to extend across the core and project beyond, and one branch of each bar is bent over against the other branch of the same bar after they are in the core and the two ends are welded together by welding material 8. Each bar, therefore forms an independent circuit in a plane substantially radial to the axis of the rotor. In the operation of welding together the ends of the two branches of each bar, the welding material is likely also to connect adjacent bars, but this is without electrical significance since there is no connection between different bars at the opposite end of the rotor, and there can be no circuit through one bar which is completed through other bars, since they are coated with insulating varnish.

The annular core is conveniently supported from a rotor spider with non-magnetic elements so that no closed magnetic circuits will be formed which include it and portions of the core. It is not essential that it should be entirely non-magnetic and it is formed in part by a sleeve 9 of non-laminated magnetic material which is carried by a shaft 10 and lies within the annular core, and spaced therefrom sufficiently to leave an ample passageway for the inner branches of the bars and to suitably adjust the leakage flux around these branches of the bars. The sleeve and shaft form a cylinder of magnetic material, but the magnetic properties of the shaft are not important if the sleeve is sufficiently thick. If, however, the shaft, which is of magnetic material, is sufficiently close to the laminated core, the sleeve need not be of magnetic material.

Connecting blocks 11, 11 of brass or other non-magnetic material form the non-magnetic elements of the rotor spider, so that closed magnetic circuits will not be formed around the inner branches of the bars taken individually or in any small groups. The main core forms a closed magnetic circuit around the inner branches taken as a whole, but, since at any instant the algebraic sum of all of the currents in these branches is zero, no magnetic flux is induced around the core as a whole by the currents in these branches, and as to any fractional groups of these branches in which the currents are in substantially the same direction there is no complete surrounding by magnetic material and all magnetic circuits around such groups are open.

In operation, during the starting period, a relatively high electromotive force is induced in the outer branches, which lie in the core slots, by the main magnetic flux of the motor. This electromotive force tends to cause a large current to flow in the windings. The magnitude of this current is, however, limited by the reactance of the inner branches which pass through the annular space between the laminated core and the non-laminated iron sleeve, since the alternations are rapid and the reactance due to the presence of the iron sleeve is high. In designing a motor of this type, the permanent value of the reactance may, by providing the proper amount of space between the core and the sleeve, be made such that the current drawn from the line at starting will be limited to any desired value. A rotor can therefore be constructed in this manner which has a starting torque substantially equal to the normal or full load running torque of the motor, and which draws from the line a sufficiently low current so that a starting device or compensator is not required.

When the motor is running at normal speed, the inner branches afford low reactance return paths for the currents generated in the outer branches since the alternations in the current in the rotor windings are slow and the reactance is low, which results in a motor having high efficiency and low slip.

I claim:

1. A rotor for an induction motor comprising a laminated annular core with slots in its exterior periphery, a shaft of magnetic material, connecting blocks of non-magnetic material for supporting the core, and windings forming independent closed circuits in substantially radial planes with one branch of each circuit lying in a slot in the core and the other branch lying in one of the openings through the core between the connecting blocks.

2. A rotor for an induction motor comprising a laminated annular core with slots in its exterior periphery, a sleeve of non-laminated magnetic material with connecting blocks of non-magnetic material forming a spider for supporting the core, and windings forming independent closed circuits in substantially radial planes with one branch of each circuit lying in a slot in the core and the other branch lying in one of the openings through the core between the connecting blocks.

3. A rotor for an induction motor comprising a laminated annular core with slots in its exterior periphery, a rotor spider having non-magnetic elements for supporting the core, and windings forming independent closed circuits in substantially radial planes with one branch of each circuit lying in a slot in the core and the other branch lying in one of the openings between the core and the spider, whereby the magnetic circuits are open around any fractional groups of the branches between the core and the spider in which the currents are in substantially the same direction.

MILLARD COLE SPENCER.